(12) United States Patent
Steenblik

(10) Patent No.: US 6,473,719 B1
(45) Date of Patent: *Oct. 29, 2002

(54) METHOD AND APPARATUS FOR SELECTIVELY CONTROLLING THE QUANTUM STATE PROBABILITY DISTRIBUTION OF ENTANGLED QUANTUM OBJECTS

(75) Inventor: Richard A. Steenblik, Alpharetta, GA (US)

(73) Assignee: Ansible, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/228,333

(22) Filed: Jan. 11, 1999

(51) Int. Cl.[7] ............................................. H01J 40/14
(52) U.S. Cl. ...................................... 702/181; 359/158
(58) Field of Search ...................... 359/151, 158–161, 359/188; 702/181

(56) References Cited

U.S. PATENT DOCUMENTS 5,418,905 A * 5/1995 Rarity et al. ................. 359/158
6,057,541 A * 5/2000 Steenblik .................... 250/225

OTHER PUBLICATIONS

Brendel et al., Pulsed energy–time entangled twin–photon source for quantum communication. pp. 1–8, Sep. 11, 1998.*

Kwiat et al., Ultra–bright source of polarization–entangled photons. pp. 1–4, May 22, 1999.*

Horodecki et al., Bound entanglement can be activated. pp. 1–4, Jun. 17, 1998.*

Bennett et al., Teleporting an unknown Quantum State via dual Classical and Einstein–Podolsky–Rosen Channels. Physical Review Letters, vol. 70, No. 13, Mar. 29, 1993.*

Alain Aspect et al., Experimental Tests of Realistic Local Theories via Bell's Theorem, Aug. 17, 1981, Phys. Let. vol. 47, No. 7, pp. 460–463.

Alain Aspect et al., Experimental Realization of Einstein–Podolsky–Rosen–Bohm Gedankenexperiment: A New Violation of Bell's Inequities, Jul. 12, 1982, Phys. Lett., vol. 49., No. 2, pp. 91–94.

(List continued on next page.)

*Primary Examiner*—Marc S. Hoff
*Assistant Examiner*—Craig Steven Miller
(74) *Attorney, Agent, or Firm*—Todd Deveau; Troutman Sanders LLP

(57) ABSTRACT

A method and system are disclosed for controlling the quantum state probability distribution of one quantum object of a pair of entangled quantum objects, which include providing a pair of entangled quantum objects, each of these objects having a uniform quantum state probability distribution, providing a system for controlling the quantum state probability distribution of the one quantum object by using the controlling system to choose the probability distribution of the observable quantum states of the other quantum object of the pair of entangled quantum objects, using the controlling system to choose the probability distribution of the quantum states of the other quantum object, choosing whether to observe the quantum state of the other quantum object, and subsequently observing the quantum state of the one quantum object of the pair of correlated quantum objects to determine if the prepared quantum state probability distribution of the one quantum object has been altered by an observation of the quantum state of the other quantum object. By such method and system, information may be selectively transmitted on observation of the quantum state of the one quantum object by selectively controlling the quantum state probability distribution of the other quantum object of the pair of entangled quantum objects.

40 Claims, 9 Drawing Sheets

OTHER PUBLICATIONS

Alain Aspect et al., Experimental Test of Bell's Inequalities Using Time–Varying Analyzers, Dec. 20, 1982, Phys. Lett., vol. 49, No. 25, pp. 1804–1807.

Z. Y. Ou, et al., Violation of Bell's Inequality and Classical Probability in a Two–Photon Correlation Experiment Jul. 4, 1988, Phys. Lett., vol. 61, No. 1, pp. 50–53.

Z. Y. Ou, et al., Observation of Spatial Quantum Beating With Separated Photodectors, Jul. 4, 1988, Phys. Lett., 61, No. 1, pp. 54–57.

Jim Baggott, The Meaning of Quantum Theory, 1992, Oxford Science Publications, pp. 148–151.

Thomas J. Herzog, et al., Complementarity and the Quantum Eraser, Oct. 23, 1995, Phys. Lett. vol. 75, No. 17, pp. 3034–3037.

Roger Penrose, Shadows of the Mind (A Search for the Missing Science of Consiousness), Oxford University Press, 1994, p. 293.

J. Glanz, Measurements are the Only Reality, Say Quantum Tests, Science, Dec. 1, 1995, vol. 270 pp. 1439–1440.

Graham P. Collins, Quantum Teleportation Channels Opened in Rome and Innsbruck, Feb. 18, 1998, Physics Today, pp. 18–32.

Herbert Kroemer, Quantum Mechanics for Engineering, Materials Science, and Applied Physics, 1994, Prentice Hall, pp. 12, 13, 20, 525.

Phillipe H. Eberhard, et al., Quantum Field Theory Cannot Provide Faster–Than–Light Communication, 1989, vol. 2, No. 2, Foundations of Physics Letters, pp. 127–149.

* cited by examiner

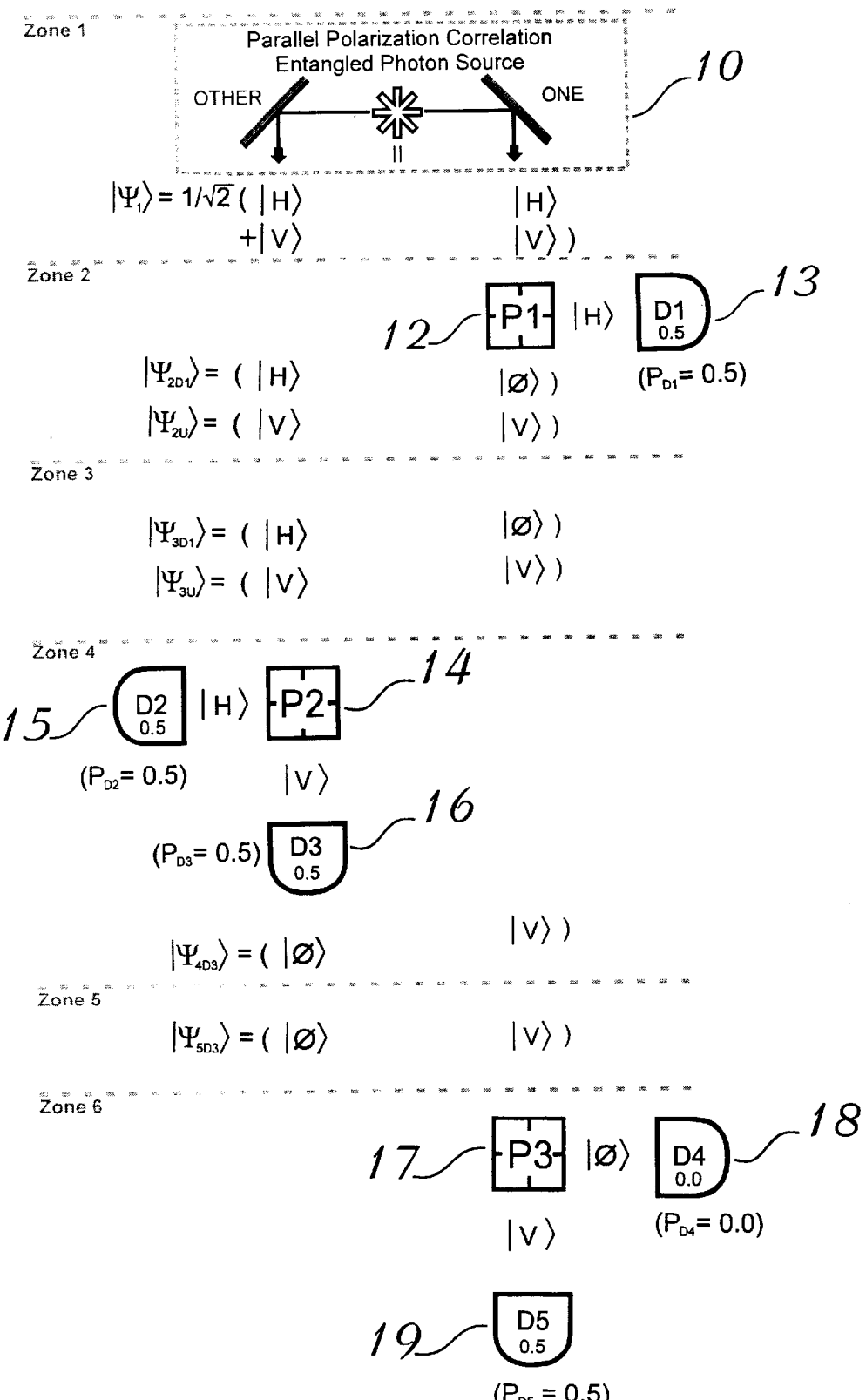
Figure 1-a

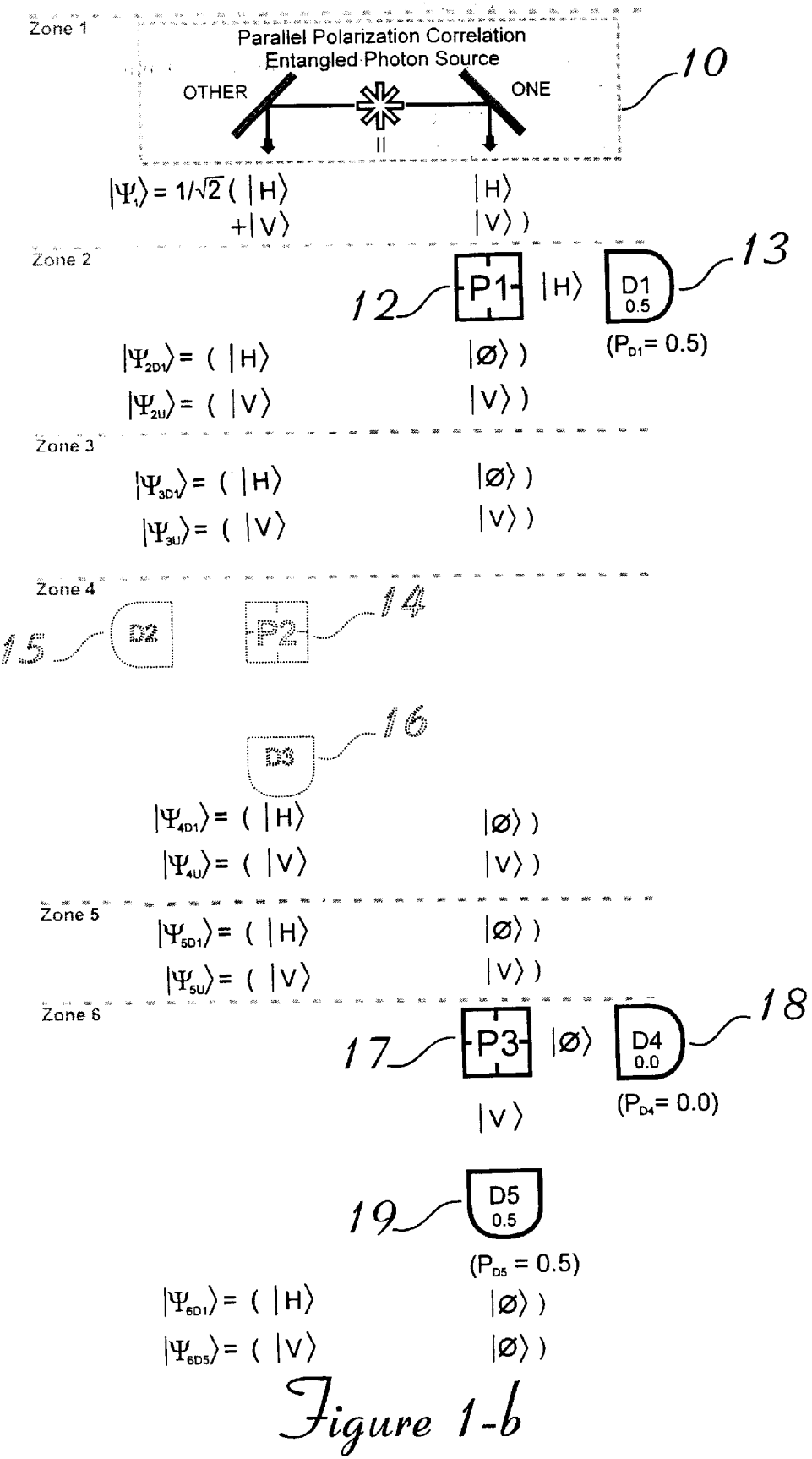
Figure 1-b

Zone 1

$|\Psi_1\rangle = (\ |v\rangle \quad\quad |v\rangle\ )$

Zone 2

$|\Psi_2\rangle = (\ |v\rangle \quad\quad |v\rangle\ )$

Zone 3

15 — D2 0.0   $|\varnothing\rangle$   P2 — 14

$(P_{D2} = 0.0)$    $|v\rangle$ $(P_{D3} = 1.0)$   D3 1.0 — 16

$|\Psi_{3D3}\rangle = (\ |\varnothing\rangle \quad\quad |v\rangle\ )$

Zone 4

$|\Psi_{4D3}\rangle = (\ |\varnothing\rangle \quad\quad |v\rangle\ )$

Zone 5

17 — P3   $|\varnothing\rangle$   D4 0.0 — 18

$|v\rangle$    $(P_{D4} = 0.0)$

19 — D5 1.0

$(P_{D5} = 1.0)$

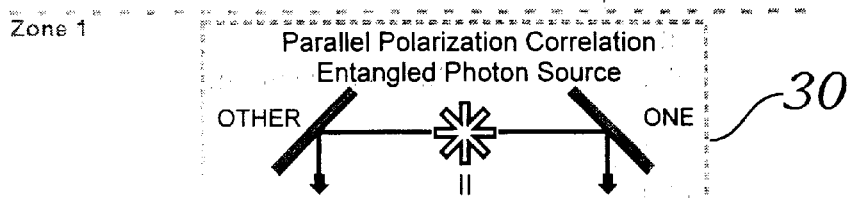
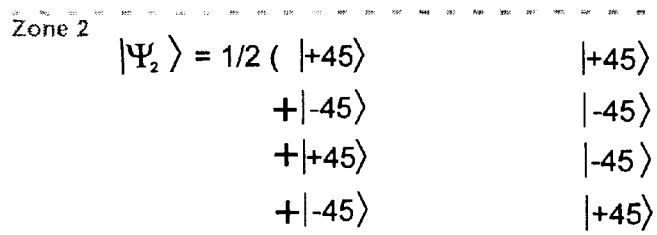
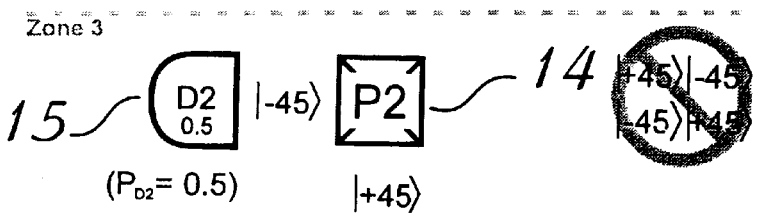
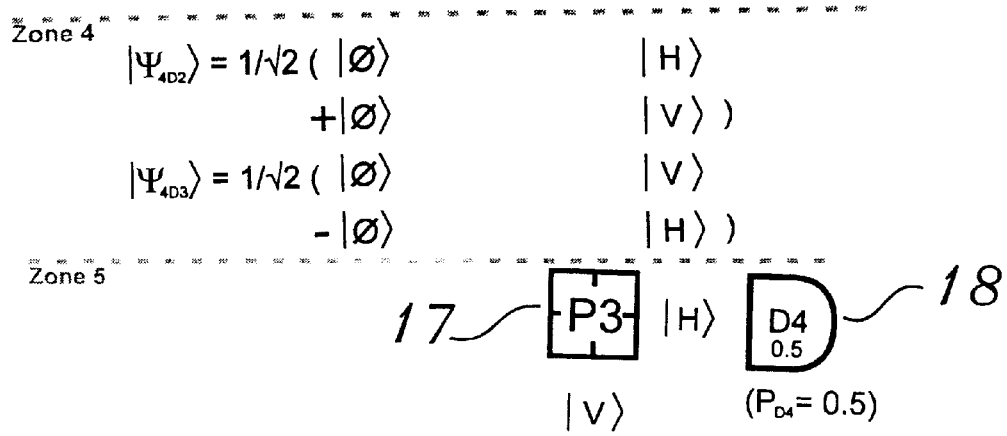
Figure 8

METHOD AND APPARATUS FOR SELECTIVELY CONTROLLING THE QUANTUM STATE PROBABILITY DISTRIBUTION OF ENTANGLED QUANTUM OBJECTS

BACKGROUND OF THE INVENTION

This invention relates to quantum non-locality modulated signaling methods.

It has been demonstrated, by Aspect and others, that under some circumstances, certain atomic species and non-linear down conversion crystals can be induced to emit entangled pairs of photons that have correlated linear polarizations; the correlated linear polarizations of the photon pairs will be found to be either always mutually orthogonal, or mutually parallel, depending on the nature of the source, when observed in any linear polarization basis. The photons can be provided in separate streams, with either one of each pair in each stream or with each photon having an equal probability of being found in either stream. It has further been strongly demonstrated that, under certain conditions, these entangled photons are not emitted with any predetermined directions of linear polarization, but that the linear polarization states of both photons only become definite upon measurement of the linear polarization of one of the photons. Thus, assuming perpendicular polarization correlation, if one photon is measured to be vertically polarized, then the other photon becomes horizontally polarized at that moment, no matter how far apart the two photons have traveled prior to the measurement. The polarization states of the two photons are 100 percent entangled; measurement of the horizontal or vertical polarization state of one photon determines the vertical or horizontal polarization state, respectively of the other (where the linear polarization correlation of the entangled photons is perpendicular), but prior to measurement, their polarization states are indefinite. In essence, the two photons are parts of the same quantum object; regardless of how far the photons travel apart from each other, changing the properties of one photon instantly changes the properties of the whole object, including the properties of the other photon. The experiments of Aspect, et al., have convinced most quantum theorists that the polarizations of these entangled photons are non-local; the polarizations are not predetermined at the time of emission, but are rather condensed into a particular state at the moment of "observation" of one of them. A. Aspect, P. Grangier and G. Roger, Phys. Lett. 47, 460 (1981) and 49, 91 (1982). A. Aspect, J. Dalibard and G. Roger, Phys. Lett. 49, 1804 (1982); Z. Y. Ou and L. Mandel, Phys. Lett. 61, 50 (1988) and 61, 54 (1988).

The correlation of properties between space-like separated entangled quantum objects has been called the EPR effect, after the scientists Einstein, Podelsky, and Rosen, who first proposed that quantum mechanics predicted that the measurable properties of such entangled quantum objects could be non-local. Various recent experiments have demonstrated that the EPR effect occurs faster than the speed of light; the speed of the EPR effect is presumed to be instantaneous.

Various quantum theorists and experimentalists have addressed the question of whether the non-locality effects of entangled particles can be employed as the basis for sending information. The published conclusions of Aspect and others have asserted that such is not possible. Baggott, Jim, *The Meaning of Quantum Theory*, Oxford Science Publications, Oxford University Press, 1992, pp. 148–150; P. Eberhard and R. Ross, Found. Phys. Lett., 2, 127 (1989). Their logic is that the passage rate of either stream of entangled photons through its respective polarizer will always appear random. Although the correlation of polarization between the two photons is not random, the probability distribution of both the sender's and the receiver's photons will be uniformly distributed into the two observed polarization states, so the receiver cannot glean information from the photons he, alone, receives. The signal and the noise are, therefore, of equal magnitude.

These conclusions are correct, so far as they go. In the systems which have been previously analyzed, the entangled photon source, emitting photons in a 'singlet' state, the quantum state superposition of horizontal and vertical polarization with equal probability amplitudes, is placed midway between the sender and the receiver, two linear polarizers are employed, one at each end of the dual photon stream, one polarizer for the sender and one for the receiver, and the photon coincidence count rate for photons passing through the two polarizers is measured as a function of the angles of the polarizers. It does appear to be true that information cannot be sent by correlation of entangled photon polarizations by means of such an apparatus designed especially for coincidence counting. Indeed, coincidence counting itself implies the existence of a classical (non-quantum) channel over which to identify coincident detector events.

It appears that prior researchers in this field have assumed that information cannot be transmitted by polarization correlation using an apparatus consisting of an entangled photon source in the singlet state, two polarizers, and two or more detectors, and that it is therefore impossible to transmit information via quantum correlations between space-like separated photons in general. It has also been commonly assumed that once a photon passes through a linear polarizer its polarization state is fixed, and that passage of polarization-entangled photons through polarizing elements causes loss of polarization entanglement. Yet another key assumption by physicists is that the entanglement of a pair of quantum objects can only persist so long as the entangled pair exists in a superposition of joint quantum states.

The commonly held belief that information cannot be transmitted via quantum correlations between space-like separated entangled photons is based on the above assumptions. I have discovered that these assumptions are incorrect. In particular: a polarization-entangled photon pair does not become disentangled if one or both of the photons pass through a polarizer; existing in a superposition of joint quantum states is not a requirement for the persistence of entanglement in polarization entangled photons; and the polarization state of a photon is not immutably fixed by interaction with a polarizer. This correct understanding of the quantum physics of polarization-entangled photons, quantum entanglement, and photon polarization makes clear the utility of my invention.

By means of a quantum mechanical wave function analysis of a polarization-entangled photon experiment performed by T. Haji-Hassan, et. Al., I have discovered that the passage of one or more photons of an entangled photon pair through a polarizing element does not cause loss of polarization entanglement and that existing in a superposition of joint quantum states is not a requirement for the persistence of entanglement. Steenblik, Richard A., *Experimental Proof that Passage Through a Polarizer Does Not Cause Loss of Entanglement*, Dec. 10, 1998, attached hereto as Appendix A. T. Haji-Hassan, A. Duncan, W. Perrie, and H. Kleinpoppen, "Polarization Correlation Analysis of the Radiation from a Two-Photon Deuterium Source Using Three Polarizers: A Test of Quantum Mechanics versus Local Realism", Phys. Rev. Lett., 62, 237 (1989).

By means of the 'Three-Polarizer Experiment', described in the following pages, it is easily demonstrated that a definite polarization state of a photon in one polarization basis may be altered by subsequent polarization operations on that photon. The polarization state of a photon is therefore not 'fixed', or immutable, until it has actually been detected by absorption.

Based on these correct understandings of polarization-entangled photons, quantum entanglement, and photon polarization, I have discovered that additional polarizers, when properly arranged and controlled, allow the separation of signal information from noise in a singlet state entangled photon system and enable the use of such a system for the transmission of information. Furthermore, I have discovered that it is possible to employ quantum correlation effects to transmit information utilizing only two polarizers if the entangled photon source emits photons in a definite polarization state instead of in the singlet state. These ends are achieved without the need to perform correlation measurements.

Unlike previous entangled quantum particle communication methods, the subject invention does not require that both photons of an entangled pair be sent to the receiver so that coincidence counts may be performed. In fact, if polarization correlation measurements or coincidence count measurements are performed, the correlations may appear to be random. Furthermore, signaling is not accomplished by means of a 'one photon per bit' control means, but by using the control means to alter the probability distribution of a plurality of photons. There is no control over the observed polarization state of any particular entangled photon pair; the control is over the probability distribution of the superposition of polarization states of a plurality of entangled photon pairs. This control of the probability distribution of the entangled photon pairs is accomplished by means of a modification of the state of one or more elements of the apparatus. In essence, it is not the final observed state of isolated entangled photon pairs which carries information, but rather the probability distribution of a plurality of entangled photon pairs which carry information. The control of the probability distribution of the entangled photon pairs is accomplished via control of the state of the apparatus, so it is ultimately the state of the total apparatus which is communicated.

It is a well known principle in quantum mechanics that the probability distribution of the observed states of quantum objects depends both on the quantum objects' superposition of states and the state of the measurement apparatus, including the choice of quantum property which is observed. The apparatus of my invention is considered to include; an entangled photon source, the system at the sending end, the system at the receiving end, and the entangled photon streams which connect these. A change in the apparatus at the sending end immediately and nonlocally affects the observations at the receiving end since the two ends of the apparatus are connected by single quantum objects which have a physical presence in both space-like separated locations.

SUMMARY OF THE INVENTION

It is, therefore, an object of the invention to provide a means and apparatus for sending information by control of non-local correlation effects in entangled pairs of quantum objects.

It is a further object of the invention to provide a means and apparatus for sending information with a transmission speed which is faster than the speed of light in a vacuum by control of non-local correlation effects in entangled pairs of quantum objects.

It is an additional object of the invention to provide a means and apparatus for linking two physically separated measurement apparatus by means of quantum non-locality effects.

It is yet another object of the invention to provide a means and apparatus to establish a co-temporal reference point for two space-like separated timekeeping apparatus via faster than light, substantially instantaneous, signaling.

It is yet another object of the invention to provide a means and apparatus for communication between two space-like separated points which is resistant to eavesdropping by a third party.

It is a further object of the invention to provide a means and apparatus for multiplexed signaling by control of non-local correlation effects in non-degenerate entangled photon pairs.

It is yet an additional object of the invention to provide a means and apparatus for signal transmission between the constituent elements of a computing device, computing system, or computing network.

It is an additional object of the invention to provide a means for sending information by the transmission of one quantum object of a pair of quantum objects to a receiver, the transmission of the other quantum object of a pair of quantum objects to a sender, and to control the quantum state probability distributions of the receiver directed quantum object by means of control of the quantum state probability distributions of the sender directed quantum object.

The subject invention is based on two quantum physics effects: the non-local correlation of quantum states of paired quantum objects and the interaction of individual quanta with a certain sequential arrangements of spin selection devices.

Quantum mechanics is a very successful set of rules and mathematical operators which can be used to predict the statistical behavior of a large number of quantum objects such as fermions, atoms, and bosons, and including, in particular, photons, the quantum units of light. Quantum mechanics does not explain why these rules work, nor why they exist in the first place. The meaning of the rules and their underlying philosophy is open to wide interpretation. The most widely accepted interpretation of quantum mechanics is called the Copenhagen Interpretation. One of the main tenets of the Copenhagen Interpretation is that the specific properties of a quantum object are indefinite until the moment of observation or detection of that object. Science, Vol. 270, DEC.10, 95, pp. 1439–1440. The experiments of Aspect and other researchers strongly support that this is true, especially for photons. Aspect 3 papers, Ou & Mandell, Baggott, supra.

Because of this principle, when quantum objects interact with each other, their quantum states are entangled and the subsequently measured properties of the objects are linked, or correlated. Since the original interaction involves the conservation of energy, momentum, quantum number, or other property, the joint quantum states of the entangled quantum objects must satisfy the appropriate conservation laws when they finally are measured. Furthermore, since the properties of each quantum object are indefinite until the moment of measurement, the only way that the conservation laws can be satisfied is if the act of measurement of the quantum state of one of the entangled quantum objects causes its entangled-pair quantum object to attain the quantum state required to satisfy the conservation laws. The Copenhagen Interpretation proposes that the act of measurement of one quantum object of and entangled pair of quantum objects "collapses" the quantum state superposition of the of the other quantum object to the required quantum eigenstate.

In the case of entangled photons, the linear polarizations of a pair are 100 percent entangled, either polarized mutually parallel or mutually polarized orthogonal, or perpendicular, to each other (Type I and Type II, respectively) according to the manner of their creation and subsequent optical manipulations, in order for the law of the conservation of angular momentum to be satisfied. These polarization correlation states, parallel correlation and perpendicular correlation, are observed to hold for any consistent polarization measurement orientation.

All attempts to visualize quantum objects fall short of reality, but the following analogy may be of use. Imagine that the photons of a parallel correlation entangled pair represent the two ends of a constantly lengthening, perfectly rigid rod, and further imagine that both ends of this rod look like the blade of a standard screwdriver, with the direction of the blade representing the linear polarization direction of the photon associated with it. Upon emission the photons are in a superposition of quantum states, such as horizontal and vertical, so each end of our imaginary rod would appear to be shaped like an X, with two 'half-real' screwdriver blades at 90 degrees to each other. Only one polarization direction can materialize for each photon at the time of observation, so the parallel-oriented blades at opposite ends of our rod are correlated to each other; either the horizontally oriented blades will materialize or the vertically orientated blades will materialize, but one horizontal blade at one end and one vertical blade at the other end will not materialize. When one photon passes through a polarizer and is detected it is forced to attain one of the definite linear polarization states of its superposition of states, while the perpendicular state potential ceases to exist. Upon observation of the polarization state of one photon we can therefore imagine the corresponding screwdriver blade direction materializing, and the perpendicular blade direction disappearing, at both ends of the rod. Thus the observation of the polarization state of one photon collapses the superposition of polarization states of both photons, forcing the remaining photon at the opposite end of the rod into a definite polarization state parallel to that of the first.

The second effect employed in this invention involves the specific nature of the interaction of quantum objects with spin selection devices. For example, the interaction of light with polarizers is usually explained in terms of electromagnetic wave theory, in which a polarizer selectively absorbs (or reflects) the vector component of the electric field which is perpendicular to its polarization axis. This view is a satisfactory rule of thumb to use when dealing with huge numbers of photons, but the behavior of individual photons must be understood in terms of quantum physics.

Polarization is the term used to identify the quantum property of spin for photons, so polarizing devices can therefore be considered to be spin selection devices for photons. A linear polarization basis is the polarizer orientation defined by the pair of orthogonal linear polarization states which are separated by a polarizer. Linear polarizers separate photons into one of two orthogonal polarization directions, such as 0° and 90° (commonly called the horizontal/vertical, or {H,V}, basis), +45 degrees and −45 degrees (the {+45,−45} basis), or at any arbitrary angle $\theta°$ and its orthogonal angle $(\theta+90)°(a\{\theta,\theta+90\}$ basis). Polarization bases which are at 45° to each other are called complimentary, so the {H,V} basis and the {+45,−45} basis are complimentary bases. According to Heisenberg's Uncertainty Principle, a photon which has a definite polarization state in one basis, such as V in the {H,V} basis, exists in a completely indefinite polarization state in a complimentary basis, such as the {+45,−45} basis. A photon never has a definite polarization state in all linear polarization bases. It can only attain a definite linear polarization state in one polarization basis at any one time.

When randomly polarized, or unpolarized, light impinges upon a linear polarizer, approximately 50 percent of the light is passed and 50 percent is absorbed or reflected, depending on the type of polarizer and its efficiency. Prior to impinging on the polarizer, the photons exist in a superposition of polarization states that provide equal probability amplitudes for the photons to attain any linear polarization state. Half the photons impinging on the polarizer attain the polarization state which passes through the polarizer, while the other half of the photons attain the polarization state which is absorbed by the polarizer. The statistics of large numbers of photons show that half pass and half are absorbed, but each individual photon is either passed or absorbed; an individual photon is never partially absorbed and partially passed. The photons behave in a binary manner, attaining one polarization state or the other. This leaves those photons which pass through the polarizer in a definite polarization state in the basis of the polarizer.

It is commonly known that if a second polarizer is placed in the path of the light after it passes through the first polarizer, the percent of light passing this second polarizer depends on the angle of its polarization axis with respect to the first polarizer. If the polarization axes are parallel, virtually all of the light passing the first polarizer will also pass the second. If the polarization axes are orthogonal to each other, i.e., crossed, or at 90 degrees to each other, almost all of the light passing the first polarizer will be blocked, or absorbed, by the second polarizer. The small amount of light which does get through is called leakage, and it is a measure of the efficiency of the polarizers. High efficiency polarizers have a very low leakage level when crossed, on the order of 1/10th of one percent (e.g., Glan-Thompson polarizing prism Newport part number 10GT04AR.14). It is probably impossible to provide perfectly efficient polarizers because of photon tunneling effects.

Referring to a pair of crossed polarizers, their important feature is their orthogonal polarization axes. For simplicity, let us assume that the polarizers are perfectly efficient and that the first polarizer passes horizontally polarized photons and that the second polarizer passes vertically polarized photons. We will assume that prior to encountering the first polarizer the polarization state of each photon is indefinite, as is the case for thermal sources, such as a candle flame. Upon encountering the first polarizer, a photon must attain either a vertical polarization state or a horizontal polarization state. The photon has an equal probability of attaining either state. If a vertical polarization is attained, the photon will be absorbed; its polarization has now been observed. If it attains a horizontal polarization, it will be passed by the polarizer. It is important to note that while a photon which passes through a polarizer exists in a definite polarization state in the basis of that polarizer, its polarization state is completely indefinite in a complimentary polarization basis.

It is known that undisturbed photons which pass through a horizontal polarizer will not subsequently pass through a vertical polarizer. When a horizontally polarized photon encounters the second, vertical, polarizer it is absorbed. The probability of attaining a vertical polarization state, and passing through a vertical polarizer, is zero for a photon which is in a definite horizontal polarization state.

Now the third polarizer enters the experiment. The first polarizer encountered by a photon is usually called the polarizer, and the second is called the analyzer. The third polarizer is placed in between the polarizer and the analyzer, and it will be called the gate. Let us assume that in this three polarizer experiment the gate is oriented with its polarization axis parallel to the polarizer. In this orientation the gate will have no effect on the passage of photons through the analyzer; the photons which pass through the polarizer will also pass the gate and be stopped by the analyzer. If the gate is oriented parallel to the analyzer, it will also have no effect on the passage of photons through the analyzer because the gate then acts like the analyzer and the photons which pass the polarizer are stopped by the gate, so they never even get to the analyzer.

A peculiar thing happens when the gate is oriented at an angle which is not parallel to either of the other polarizers. It is convenient to choose the angle of the gate to be 45 degrees from both the analyzer and the polarizer. Recall that a photon passing through the first polarizer has a definite horizontal polarization but the polarization state of this photon is completely indefinite in the {+45,−45} linear polarization basis of the gate. When this photon encounters the gate it must attain a new polarization state consistent with the basis of the gate. It must attain a polarization state parallel to the polarization axis of the gate or perpendicular to it, and be passed or absorbed, respectively. The photon has an equal probability of attaining either of these states, but it upon encountering the gate it cannot exist in a superposition of both states.

If the photon passes the gate, it has attained definite polarization state of 45° degrees in {+45,−45} polarization basis, but it now has an indefinite polarization state in the original {H,V} basis. Since the photon now exists in a superposition of states in the {H,V} basis it has an equal probability of attaining either the H polarization state or the V polarization state if subsequently forced to do so. Upon encountering the analyzer the photon either attains an H polarization state and is absorbed by the analyzer, or it attains a V polarization state and is passed through the analyzer. Half of the photons which survive passage through both the polarizer and the gate will pass the analyzer with a V polarization state.

Thus, some of the photons which passed through the first polarizer, having attained a definite H polarization, are allowed to attain a definite V polarization and pass through the analyzer because they were forced to attain a definite polarization state in a complimentary polarization basis in between the polarizer and the analyzer. This is commonly referred to as a quantum eraser operation, in which a photon's definite polarization state in one basis becomes indefinite in that basis by subsequently forcing the photon to attain a definite polarization state in a complimentary basis.

The proportion of photons which pass each of the polarizing elements is 50 percent, so the probability or proportion of photons which make it all the way through all three polarizing elements is (0.5×0.5×0.5)=0.125, or 12.5 percent. These are the photons that make all of the "right" decisions at each polarizer. The remainder, 87.5 percent, make one "wrong" decision somewhere along the way and get absorbed.

Put in terms of the Dirac notation of the quantum mechanics wave function formalism, the three polarizer experiment can be analyzed as follows: A photon in an initially unpolarized state can be represented as having a superposition of linear polarization states in a chosen basis, such as the {H,V} basis:

$$|\Psi\rangle = 1/\sqrt{2}(|H\rangle + |V\rangle).$$

After passing through a polarizer oriented in the {H,V} basis the photon attains a definite polarization state, such as $$|\Psi\rangle = |H\rangle.$$

This definite linear polarization state in one polarization can be 'erased' by causing the photon to attain a definite polarization state in a complimentary basis, such as $$|\Psi\rangle = |-45\rangle,$$

in the {+45,−45} basis. T. Herzog, P. Kwiat, H. Weinfurter, and A. Zeilinger, "Complimentarity and the Quantum Eraser", Phys. Rev. Lett., 75, 3034 (1995). This leaves the photon in a superposition of states in the original polarization basis $$|\Psi\rangle = 1/\sqrt{2}(|H\rangle + |V\rangle).$$

Passage of the photon through a polarizing element aligned with the original polarization basis (the {H,V} basis) may then result in the photon attaining a definite polarization state which is orthogonal to the original definite polarization state, such as $$|\Psi\rangle = |V\rangle$$

in this example. It is thus demonstrated that the definite polarization state of a photon in one polarization basis may be altered by subsequent polarization operations on that photon, and the probability distribution of its polarization states can be thereby controlled. It is clear that the polarization state of a photon only becomes determinate, or fixed, at the time of 'observation', or 'measurement', which is the moment of the absorption of the photon by an electron. At that moment the photon ceases to exist and its properties are not subject to further change.

I have performed three-polarizer experiments with lasers, which, by virtue of their large photon flux and large temporal coherence length, approximate the classical physics limit of continuous transverse electromagnetic waves, with results as described above. I have also performed three-polarizer experiments with a stream of single photons, having a 98 micron temporal coherence length at an emission rate of 6,800 photons per second, finding the same results as described above. In the latter experiment there was an average separation of approximately 2 kilometers between photon wavepackets and, correspondingly, a vanishing probability of the overlap of two photon wavepackets in the experimental apparatus, demonstrating that the principles governing the interaction of light with polarizers are fundamentally quantum phenomena which apply to individual photon wavepackets.

In summary, it has been demonstrated that certain processes can produce correlated pairs of quantum objects, such as photons, which have entangled polarization states; observation of the polarization of one photon sets the polarization state of its companion to the compatible value required by the applicable Conservation of Angular Momentum constraint on that entangled photon pair. It has also been demonstrated that the linear polarization state of a photon can be altered by causing the photon to make a sequence of quantum choices as it passes through a series of linear polarizers oriented in a plurality of polarization bases. It has further been demonstrated that the passage of polarization-entangled photons through polarizing elements does not cause the loss of their polarization entanglement and that the persistence of entanglement in a polarization-entangled photon pair does not require that the photons always exist in a superposition of polarization states in all polarization bases.

In light of these teachings, the above objects of the present invention are accomplished by providing a method and apparatus for controlling the quantum state probability distribution of ONE quantum object of a pair of entangled quantum objects, which method includes the steps of providing a pair of entangled quantum objects having a prepared quantum state probability distribution, providing a means for controlling the quantum state probability distribution of the ONE quantum object by using said controlling means to alter the probability distribution of the observable quantum states of the OTHER quantum object of the pair of entangled quantum objects, choosing whether to use said controlling means to alter the probability distribution of the quantum states of the OTHER quantum object, choosing whether to observe the quantum state of the OTHER quantum object, and subsequently observing the quantum state of the ONE quantum object of said pair of entangled quantum objects to determine if said prepared quantum state probability distribution of said ONE quantum object has been altered by an observation of the quantum state of the OTHER quantum object. By such method, information may be selectively transmitted on observation of the quantum state probability distribution of the ONE quantum object by selectively controlling the quantum state probability distribution of the OTHER quantum object of the pair of entangled quantum objects and thereby selectively choosing whether to affect an alteration of the quantum state probability distribution of the ONE quantum object which is subsequently observed.

The method of the invention is suitable for a variety of quantum objects including fermions, atoms, and bosons, including, in particular, photons. The pair of entangled quantum objects may be provided as a part of a pair of streams of entangled quantum objects which may be provided by any one of a number of means including, but not limited to, a two-quantum absorption/two-quantum emission process, such as spin conserving two photon atomic emission processes including, for example, atomic cascade and spontaneous emission from atomic deuterium or atomic calcium, spin-conserving subatomic particle interactions, such as electron-positron annihilation radiation emission or low-energy proton-proton scattering, and optical parametric down conversion processes, including both Type I and Type II parametric down conversion.

The source of the pair of entangled quantum objects may provide a pair in the singlet state, a superposition of states, or in a definite state. When the pair of entangled quantum objects is provided in a definite quantum state, the quantum state probability distribution can be transformed into a superposition of states, if desired, by various means, such as by rotating the plane of polarization, or spin direction, of one stream of quantum objects and combining it with the other, unrotated stream of quantum objects. Ou and Mandel 1, supra. (Entangled photons emitted by certain non-linear parametric down-conversion crystals can be emitted in a definite polarization state in one basis, but which are completely indefinite in a complimentary basis, furthermore, omnidirectional polarization correlation effects can still be obtained by performing certain additional operations on the photons.)

The means for controlling the quantum state probability distribution of the ONE quantum object by using the means to choose the quantum state probability distribution of the OTHER quantum object consists of quantum spin selection or quantum spin altering devices such as polarizing beam splitters, Nichols prisms, tourmaline crystals, calcite crystals, electro-optic crystals, non-linear optical crystals, birefringent polarizing elements, wave plates, Kerr cells, Pockels cells, Faraday rotators, optically rotating materials and solutions, polarizing plastic sheet material ('Polaroid' polarizers), polarization preserving optical fiber, Stem-Gerlach magnets, and similar optical polarization and spin selection components and combinations thereof. These quantum spin selection or quantum spin altering devices may be used in combination with detection devices or devices to absorb and observe the quantum spin state of the OTHER quantum object.

Preferably, the pair of entangled quantum objects is provided as a part of separated streams of entangled quantum objects. In the case of entangled photons, this may be accomplished by use of a device selected from the group consisting of lenses, prisms, mirrors, beam splitters, polarizing beam splitters and combinations thereof in conjunction with the source for providing such correlated photons. These devices may also be further employed to provide an equal probability of first detecting either photon of a pair in either stream, if desired. In the case of entangled quantum objects other than photons, these means may be accomplished by use of devices which are the functional equivalent of the optical devices, such as the use of a uniform magnetic field to act as a 'prism', or the use of a confined electric field to act as a 'lens' for charged entangled quantum objects, such as spin-entangled protons.

The step of choosing whether to alter and observe the probability distribution of the quantum states of the OTHER quantum object may selectively include either observing or not observing the quantum state of the OTHER quantum object in one of a plurality of polarization, or spin direction, bases, depending upon whether the user of the method desires to transmit information by modulating the quantum state probability distribution of the ONE quantum object, or not. In addition, by observing the quantum state of the OTHER quantum object by means of a spin selection device, it is possible to select whether to alter or not to alter the probability distribution of the ONE quantum object depending upon the choice of spin basis of the spin selection device.

In the case of polarization-entangled photons it is possible to select whether or not to alter the probability distribution of the ONE photon depending on the choice of polarization basis of the polarization selection device used to observe the polarization state probability distribution of the OTHER photon, and this choice may selectively include either observing or not observing the polarization state probability distribution of the OTHER photon.

My invention may be more completely understood by reference to the drawings and detailed description of the preferred embodiment provided below.

BRIEF DESCRIPTION OF THE DRAWINGS

FIG. 1-a is a schematic illustration of one embodiment of my present invention employing a parallel polarization correlation entangled photon source emitting photons in the singlet state;

FIG. 1-b is a schematic illustration of the invention of FIG. 1-a modified to show how the choice of not observing the polarization state probability distribution of the OTHER photon results in the same observed probability distribution of the ONE photon as in FIG. 1-a;

FIG. 8 is a schematic illustration of the invention of FIG. 7 modified to show how signaling can be switched.

DESCRIPTION OF THE PREFERRED EMBODIMENT

Figure 2:
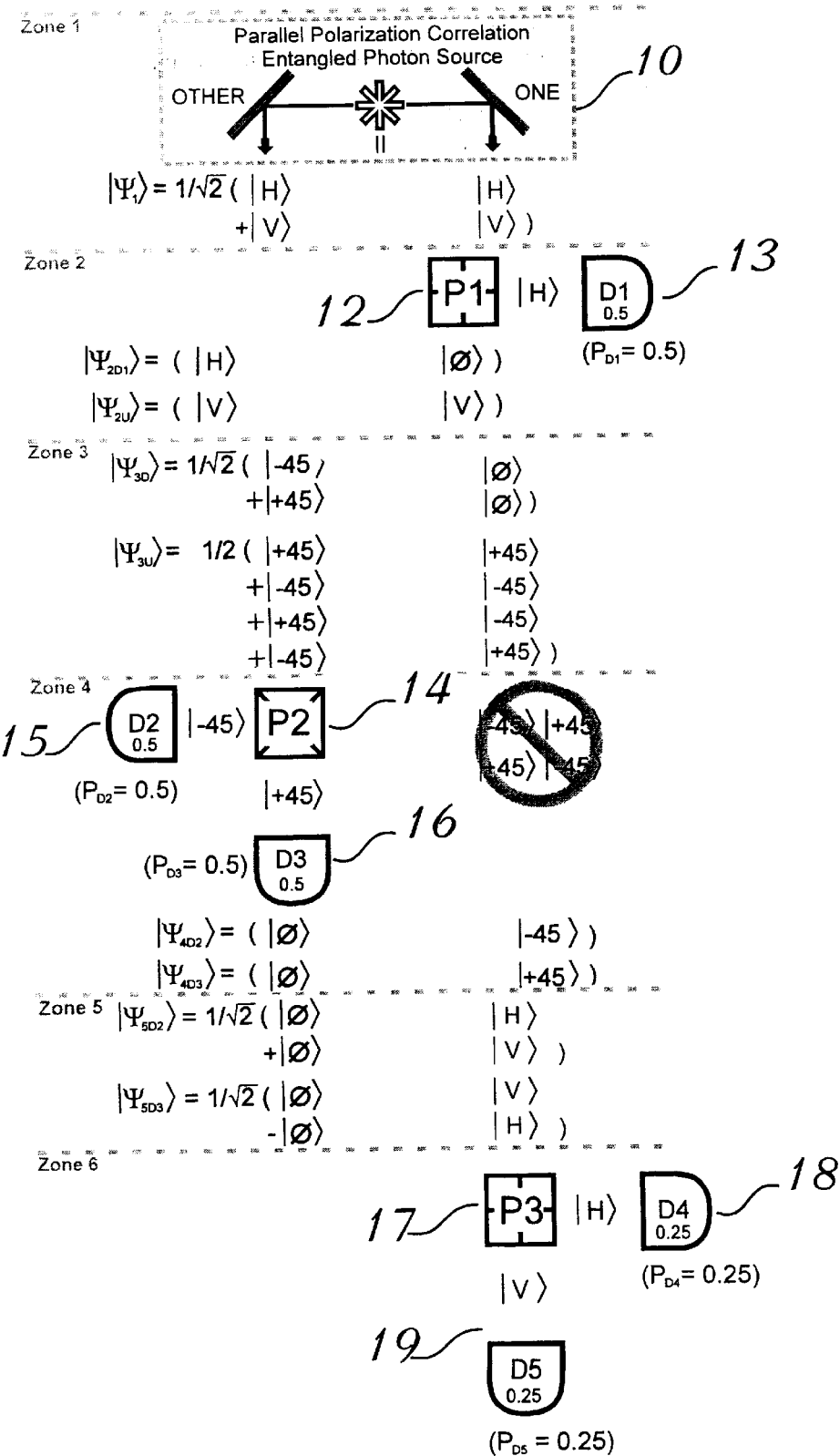
FIG. 2 is a schematic illustration of the invention of FIG. 1-a modified to show how the signaling can be switched.

Referring now to the Figures wherein the reference numerals designate like parts, the system and method of the present invention is shown in its preferred embodiment.

All of the Figures are divided into zones to facilitate their explanation. FIGS. 1-a, 1-b and 2 illustrate the operation of this invention by tracing the quantum mechanical polarization state wave functions of photons emitted from a source, 10, of parallel correlated polarization-entangled photon pairs through two different optical paths. The paths are labeled 'OTHER' and 'ONE'. They are drawn as though they are parallel to each other in order to make clear the temporal relationship of the processes acting on the photons. In practice these paths are more likely to extend in opposite directions from the source, 10. Each of the zones represents a co-temporal period for the photons in both paths; the beginning and ending positions of the zones represent equivalent optical path distances for their respective photons from the source, 10. Thus OTHER photons will arrive at the beginning of Zone 2 in the OTHER path at the same time as ONE photons will arrive at the beginning of Zone 2 in the ONE path, and both photons of the correlated pair will have traveled the same optical path distance from the source, 10. The zones are encountered sequentially by the photons, so the operations of zone 1 are performed before those of Zone 2, and so on.

Referring now to FIG. 1-a, a source, 10, of parallel polarization correlation entangled photon pairs provides photons into the two paths, OTHER and ONE. These photons are preferably, but not necessarily, produced by a Type I optical degenerate parametric down-conversion process such as recently disclosed by P. Kwiat, arranged such that the photons consist of an equal number of entangled pair signal and idler photons which all have an equal probability of being found in either path, with one preferred caveat; if a particular photon is observed in the ONE path then its pair photon can only be subsequently observed in the OTHER path. P. G. Kwiat, E. Waks, A. G. White, I. Appelbaum, and P. H. Eberhard, "Ultra-bright source of polarization-entangled photons", preprint paper submitted to Phys. Rev. Lett. on Oct. 2 1998, available as paper quant-ph/9810003 from http://xxx.lanl.gov/abs/quant-ph/9810003. This caveat can be relaxed at the expense of the signal to noise ratio. A source of this type will provide the signal and idler photon pairs in the singlet state, a polarization entangled joint photon state which can be represented in the Dirac notation as:

$$|\Psi_1\rangle = 1/\sqrt{2}(|H\rangle|H\rangle + |V\rangle|V\rangle).$$

This equation is read in the following way: the photon wave function $|\Psi_1\rangle$ (psi-sub-1) consisting of the two joint polarization states of;

finding a horizontally polarized photon in the OTHER path and that photon's entangled-pair photon in the ONE path to also have a horizontal polarization state, or finding a vertically polarized photon in the OTHER path and that photon's entangled-pair photon in the ONE path to also have a vertical polarization state, with both joint polarization states existing in a superposition of equal probability amplitudes of value $1/\sqrt{2}$.

This joint photon wave function is shown in FIG. 1-a at the bottom of Zone 1, with the joint photon states separated to indicate the possible photon polarizations to be found in each of the OTHER and the ONE paths. Because of the conditions of the creation of the entangled photons, this joint photon wave function is bound by the requirement that the photons of such an entangled pair satisfy the Conservation of Angular Momentum constraint that they must resolve to parallel polarization states in any polarization basis, as has been shown by numerous published experiments. Kwiat, supra.

In Zone 2 the photons encounter a polarizer oriented to the $\{H,V\}$ basis, 12. Polarizer 12, labeled P1 for convenience, deflects the ONE path horizontal polarization states of the wave function into detector 13, labeled D1. The probability that a ONE path photon will be deflected to detector 13 is 0.5, as indicated in the Figure by the statement ($P_{D1}$=0.5). If a ONE path $|H\rangle$ photon is detected by detector 13, then its OTHER path entangled pair photon 'collapses' into the real single photon state of $|H\rangle$ in the OTHER path. This is indicated by the equation $$|\Psi_{2D1}\rangle = (|H\rangle|\emptyset\rangle)$$

in which $|\Psi_{2D1}\rangle$ means 'the wave function in Zone 2 of the photon remaining in the OTHER path after its pair was detected by D1 in the ONE path' and the state $|\emptyset\rangle$ (the null state) indicates that there is no photon in the ONE path.

The joint polarization state containing the $|V\rangle$ state in the ONE path passes through polarizer 12 without detection, resulting in the Zone 2 undetected joint photon state wave function $$|\Psi_{2U}\rangle = (|V\rangle|V\rangle).$$

Only the $|\Psi_{2U}\rangle$ wave function can subsequently influence the probability distribution of detectors 18 and 19 in the ONE path. Recall that the ONE path photon of the $|\Psi_{2D1}\rangle$ wave function was removed by detector 13, so it cannot have any effect on detectors 18 and 19 probability distributions.

The separate wave function states of Zone 2 propagate into Zone 3 without alteration, resulting in Zone 3 wave function state mixture of $$|\Psi_{3D1}\rangle = (|H\rangle|\emptyset\rangle)$$

and $$|\Psi_{3U}\rangle = (|V\rangle|V\rangle).$$

In Zone 4 the OTHER path wave function states are sorted out by polarizer 14, labeled P2 for convenience. The OTHER path |H> state from $|\Psi_{3D1}>$ is deflected by polarizer 14 to detector 15, labeled D2, and the OTHER path |V> state from $|\Psi_{3U}>$ is passed through to detector 16, labeled D3. No ONE path photons from the wave function $|\Psi_{3D1}>$ survive Zone 4, since this wave function only contains photons in the OTHER path, and all of these are detected by detector 15.

The only photons remaining after Zone 4 are the ONE path photons from $|\Psi_{3U}>$ whose OTHER path paired photons were detected by detector 16 in the |V> state, so their ONE path photons must remain in the |V> state in order to satisfy the Conservation of Angular Momentum constraint that the photons of a parallel polarization correlation entangled pair attain parallel polarization states upon the observation of one of the photons. Thus the wave function remaining at the end of Zone 4 is $$|\Psi_{4D3}>=(|\emptyset>|V>).$$

This wave function propagates unaltered through Zone 5 as $$|\Psi_{5D3}>=(|\emptyset>|V>).$$

In Zone 6 the polarization state of the $|\Psi_{5D3}>$ wave function is sorted out by polarizer 17, labeled P3 for convenience. There are no |H> states to be deflected by polarizer 17 to detector 18, indicated by the null state $|\emptyset>$ directed toward detector 18. The |V> state is passed through to detector 19, labeled D5.

The probability that a ONE path photon emitted from source 10 will be deflected to detector 18 is 0.0, as indicated in FIG. 1-$a$ by the statement ($P_{D4}$=0.0). The probability that a ONE path photon emitted from source 10 will be passed through polarizer 17 to detector 19 is 0.5, as indicated in FIG. 1-$a$ by the statement ($P_{D5}$=0.5). These probability distributions assume perfect optics and perfect detectors. The ratio $P_{D4}/P_{D5}$ in this ideal case is (0.0)/(0.5)=zero. The performance of actual optical elements will not be quite so ideal, and so will yield a higher value for the ratio $P_{D4}/P_{D5}$, but only in the case of completely inefficient polarizers will this ratio approach the value of 1. Typical polarizer efficiencies of 0.95 and detector efficiencies of 0.7 would result in a $P_{D4}/P_{D5}$ ratio on the order of (0.03)/(0.3)=0.1.

FIG. 1-$a$ therefore demonstrates that choosing an {H,V} polarization basis for polarizer 14 in the OTHER path results in an ideal ONE path detectors 18 and 19 probability distribution ratio, $P_{D4}/P_{D5}$, of zero.

FIG. 1-$b$ is a schematic illustration of the invention of FIG. 1-$a$ modified to show how the choice of not observing the polarization state probability distribution of the OTHER photon results in the same observed probability distribution of the ONE photon as in FIG. 1-$a$. In FIG. 1-$b$ the Zone 4 OTHER path elements, including polarizer 14 and detectors 15 and 16, have been removed. No OTHER path photons are therefore detected in Zone 4. In fact, no OTHER path photons are ever detected in FIG. 1-$b$, illustrating the effect of choosing to not observe the state of the OTHER photon. In FIG. 1-$b$ the sequential wave function states demonstrate that the choice of not observing the state of the OTHER photon results in the same ONE path detectors 18 and 19 probability distribution ratio, $P_{D4}/P_{D5}$=0, as in FIG. 1-$a$.

FIG. 2 is a schematic illustration of the invention of FIG. 1-$a$ modified to show how the signaling can be switched by choosing a different polarization basis for polarizer 14. In FIG. 1-$a$ polarizer 14 was oriented in the {H,V} polarization basis, while in FIG. 2 this polarizer is oriented in the complimentary {+45,−45} basis.

The wave function analysis of FIG. 2 is identical to that of FIG. 1-$a$ through Zone 2. Because polarizer 14 in Zone 4 is oriented in a different polarization basis than the wave function basis of Zone 2, the Zone 2 wave functions are projected onto the new polarization basis according to the Projection Postulate of quantum mechanics, putting $|\Psi_2>$ in terms of the possible eigenstates of the new polarization basis. Baggott, pp. 60–74, 120–130. Application of the Projection Postulate involves the assignment of projection amplitudes according to an internally consistent phase convention. In the analyses of the Figures the joint projection amplitudes phase convention given in Table 1 is applied, consistent with the teachings of Baggott. Baggott, p. 67, supra.

TABLE 1

Projection amplitudes, <ψf|ψi>,
for photon polarization states

|  | Initial state |ψi> | | | |
| --- | --- | --- | --- | --- |
| Final state |ψf> | |V> | |H> | |+45> | |−45> |
| |V> | 1 | 0 | 1/√2 | 1/√2 |
| |H> | 0 | 1 | −1/√2 | 1/√2 |
| |+45> | 1/√2 | −1/√2 | 1 | 0 |
| |−45> | 1/√2 | 1/√2 | 0 | 1 |

Thus, for example, the projection amplitude for an initial polarization state of |H> to a final polarization state of |+45>, written <+45|H>, would be (−1/√2).

When the wave functions of Zone 2 are projected from the {H,V} basis onto the {+45,−45} basis, the results are $$|\Psi_{3D1}>=1/\sqrt{2}(|-45>|\emptyset>+|+45>|\emptyset>),$$

and $$|\Psi_{3U}>=1/2(|+45>|+45>+|-45>|-45>+|+45>|-45>+|45>|+45>).$$

In Zone 4 the OTHER path wave function states are sorted out by polarizer 14. The OTHER path |−45> states, from both $|\Psi_{3D1}>$ and $|\Psi_{3U}>$, are deflected by polarizer 14 to detector 15, and the OTHER path |+45> states, also from both $|\Psi_{3D1}>$ and $|\Psi_{3U}>$, are passed through to detector 16. No photons from the wave function $|\Psi_{3D1}>$ survive Zone 4, since this wave function only contains photons in the OTHER path, and all of these are detected by either detector 15 or detector 16.

The only photons remaining after Zone 4 are the ONE path photons whose OTHER path paired photons were detected by detector 16. The OTHER path photons in the $|\Psi_{3U}>$ wave function are detected by detectors 15 and 16 to be in either the |−45> state or the |+45> state, respectively, so their ONE path photons must attain either the definite states of |−45> or |+45>. Since the OTHER photons have individually collapsed into a definite polarization state, their paired ONE photons also collapse into a definite state consistent with the Conservation of Angular Momentum constraint. The symbol

in the ONE path of Zone 4 indicates that there are joint states of wave function $|\Psi_{3U}>$ which cannot materialize, since they do not satisfy the Conservation of Angular Momentum constraint. In the literature of quantum mechanics such joint states that cannot materialize have been termed 'real, but not physical'.

At the end of Zone 4 the ONE photons are therefore not individually in a superposition of states, but the ensemble of ONE photons is in a mixture of the states of $|-45>$ and $|+45>$. The individual states of that mixture are given by the wave functions $$|\Psi_{4D2}>=(|\emptyset>|-45>),$$

and $$|\Psi_{4D3}>=(|\emptyset>|+45>).$$

The polarizer in Zone 6 is oriented in the {H,V} basis, so the wave functions $|\Psi_{4D2}>$ and $|\Psi_{4D3}>$ are projected onto the {H,V} basis, resulting in the Zone 5 wave functions $$|\Psi_{5D2}>=1/\sqrt{2}(|\emptyset>|H>+|\emptyset>|V>),$$

and $$|\Psi_{5D3}>=1/\sqrt{2}(|\emptyset>|V>-|\emptyset>|H>).$$

In Zone 6 the component states of the $|\Psi_{5D2}>$ and $|\Psi_{5D3}>$ wave functions are sorted out by polarizer 17. The $|H>$ states, from both $|\Psi_{5D2}>$ and $|\Psi_{5D3}>$, are deflected by polarizer 17 to detector 18. The $|V>$ states, from both $|\Psi_{5D2}>$ and $|\Psi_{5D3}>$, are passed through to detector 19.

The probability that a ONE path photon emitted from source 10 will be deflected to detector 18 is 0.25, as indicated in FIG. 2 by the statement ($P_{D4}=0.25$). The probability that a ONE path photon emitted from source 10 will be passed through polarizer 17 to detector 19 is 0.25, as indicated in FIG. 2 by the statement ($P_{D5}=0.25$). As in the analysis of FIG. 1-a, these probability distributions assume perfect optics and perfect detectors. The ratio $P_{D4}/P_{D5}$ in this ideal case is $(0.25)/(0.25)=1$. The performance of actual optical elements will not be quite so ideal, and so may yield a slightly different value for the ratio $P_{D4}/P_{D5}$, but so long as the optical elements have realistically symmetrical properties, the value of the ratio $P_{D4}/P_{D5}$ will always be close to unity. The actual measured value of the ratio $P_{D4}/P_5$ will largely depend on the difference in efficiencies of detectors 18 and 19, and on the instability of these values. Typical quantum efficiencies for commercially available avalanche photo-diode single-photon detectors range from 0.60 to 0.70, which would result in realistic $P_{D4}/P_{D5}$ ratio in the range of 0.86 to 1.2.

FIG. 2 therefore demonstrates that choosing a {+45,−45} polarization basis for polarizer 14 in the OTHER path results in an ideal ONE path detectors 18 and 19 probability distribution ratio, $P_{D4}/P_{D5}$, of 1. This result is different from that of FIGS. 1-a,b, which showed a value of 0 for the $P_{D4}/P_{D5}$ ratio. Comparison of FIGS. 1-a, 1-b, and 2 demonstrates that the choice of polarization basis of polarizer 14 in the OTHER path, and the choice of whether to observe the OTHER photons by means of polarizer 14 and detectors 15 and 16, constitutes a means to control the probability distribution of the ONE photons as observed by ONE path polarizer 17 and detectors 18 and 19. This ONE path photon probability distribution control means is non-local, since it is disposed in the OTHER path, yet it controls the probability distribution of detectors 18 and 19 in the ONE path which may be space-like separated from the control means. Since the probability distribution ratio $P_{D4}/P_{D5}$ of ONE path detectors 18 and 19 is distinguishably different between FIGS. 1-a,b and 2, and the determination of this probability distribution ratio does not require the use of coincidence counting nor knowledge of OTHER path detector results, this means to control the probability distribution constitutes a means to signal.

The signaling accomplished by this means to control is not limited by the speed of light since it is accomplished by the 'collapse of the joint state wave function'. Experimental results have indicated that this occurs substantially faster than the speed of light, and the commonly held theoretical assumption is that the collapse of the joint state wave function occurs instantaneously, over any distance. (G. Weihs, T. Jennewein, C. Simon, H. Weinfurter and A. Zeilinger, "Violation of Bell's inequality under strict Einstein locality conditions", preprint available as paper quant-ph/9810080 from http://xxx.lanl.gov/abs/quant-ph/9810080.). The subject invention therefore constitutes a means to send information faster than the speed of light, with the OTHER path representing the sending side and the ONE path representing the receiving side. Since no physical object moves faster than the speed of light to accomplish this effect there are no violations of Einstein causality or Special or General Relativity.

Figure 3:
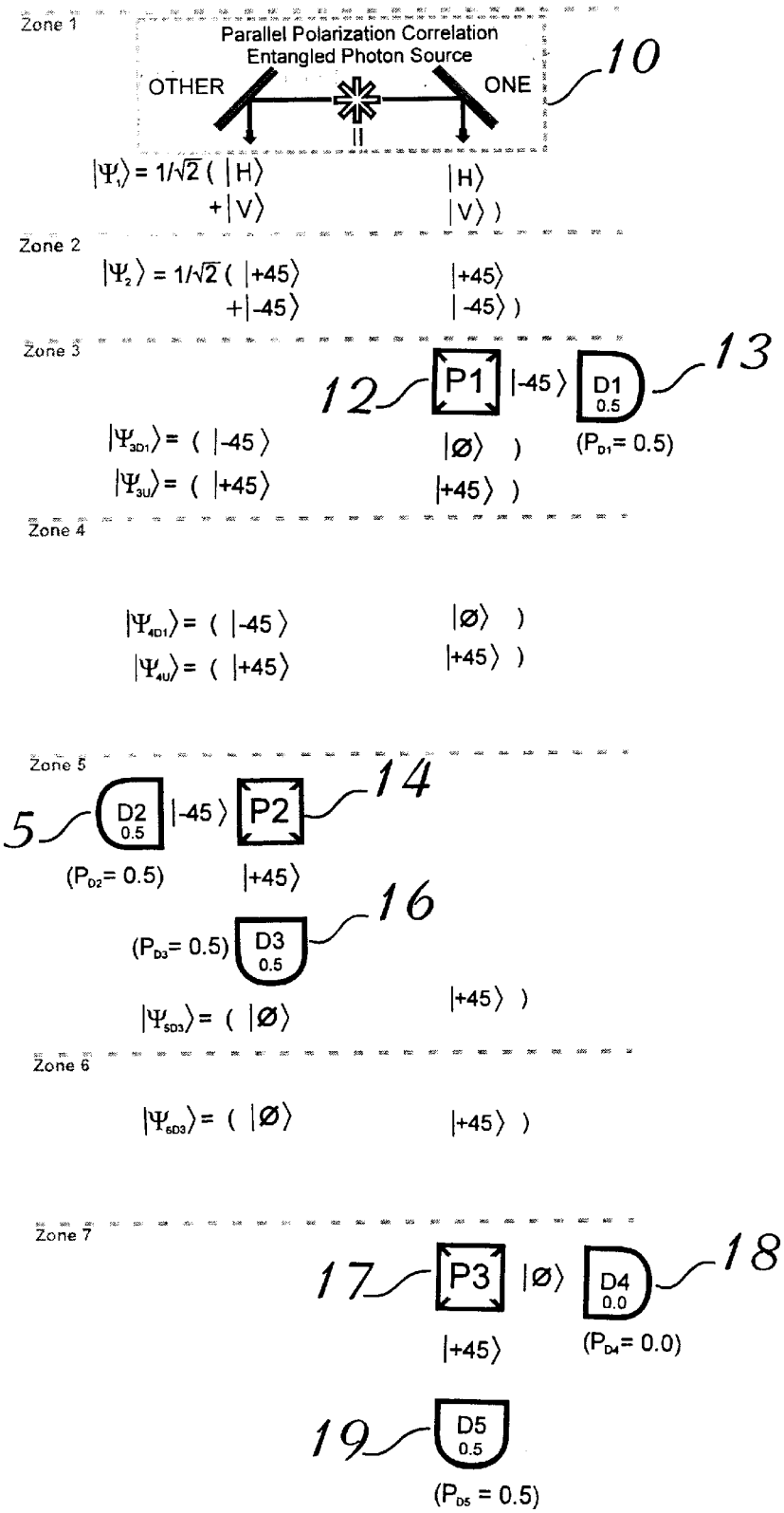
FIG. 3 is a schematic illustration of an alternative embodiment of my present invention employing a parallel polarization correlation entangled photon source emitting photons in the singlet state.

FIG. 3 is a schematic illustration of an alternative embodiment of my present invention, employing a parallel polarization correlation entangled photon source emitting photons in the singlet state. The function of the embodiment of FIG. 3 is similar to that of FIG. 1-a, but the polarization basis of the ONE path polarizers, 12 and 17, is the {+45,−45} basis. The OTHER path polarizer 14 is also oriented in this polarization basis, and the ONE detector probability distribution ratio, $P_{D4}/P_{D5}$, is zero, as it was in FIGS. 1-a,b. FIG. 3 therefore illustrates that when the OTHER path means to control the probability distribution, polarizer 14 and detectors 15 and 16, is aligned with the polarization basis of the ONE path polarizers, 12 and 17, the ONE detector probability distribution ratio, $P_{D4}/P_{D5}$, is zero. As was demonstrated in FIG. 1-b, if the means to control the probability distribution, OTHER polarizer 14 and detectors 15 and 16, is removed, choosing to not observe OTHER photons, the ONE detector probability distribution ratio, $P_{D4}/P_{D5}$, would also be zero, since the presence of the OTHER means to control in this orientation does not alter the wave function states of the ONE photons.

Figure 4:
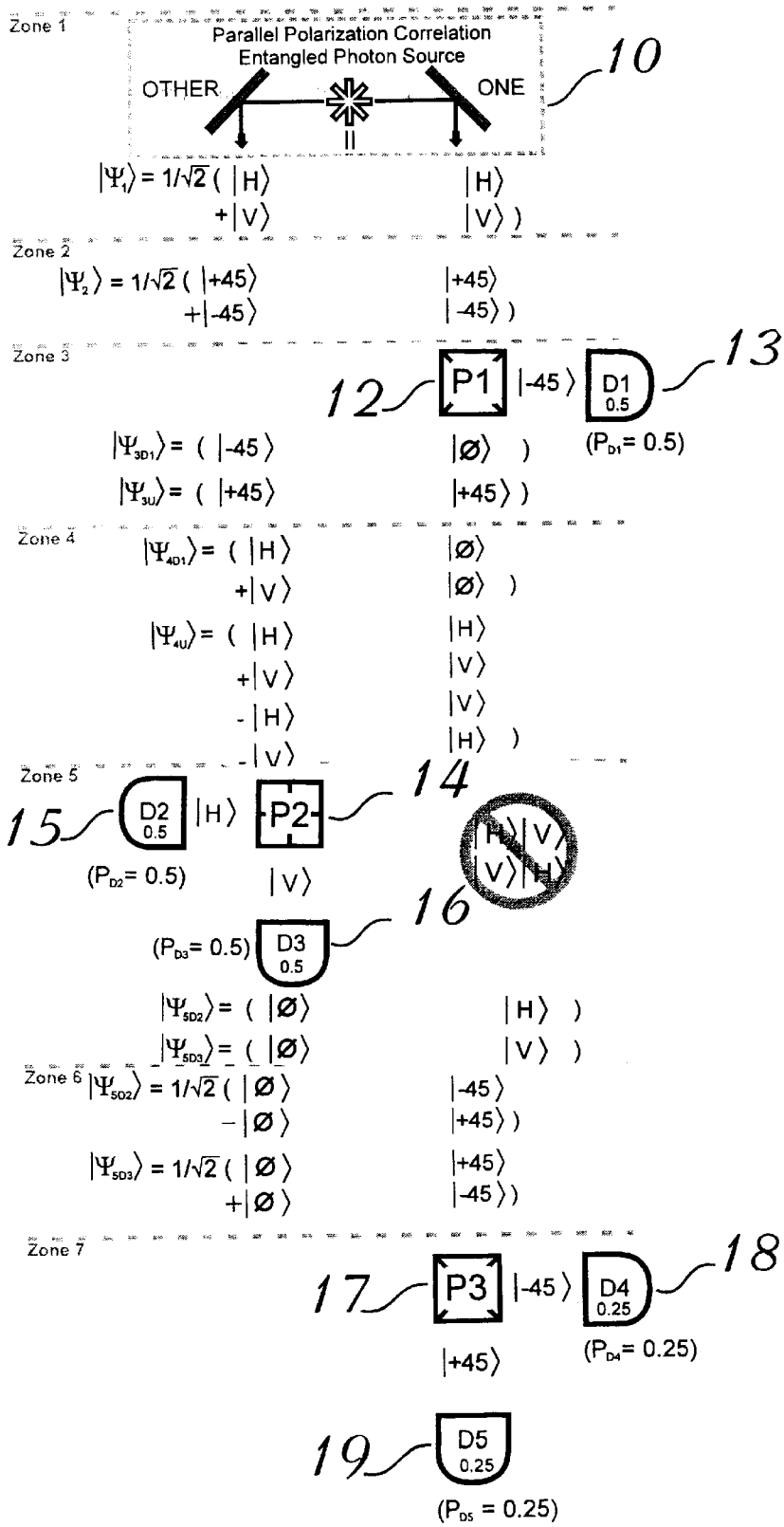
FIG. 4 is a schematic illustration of the invention of FIG. 3 modified to show how signaling can be switched.

FIG. 4 is a schematic illustration of the invention of FIG. 3 modified to show how signaling can be switched by choosing the {H,V} polarization basis for OTHER polarizer 14. When the OTHER path polarizer, 14, is thus oriented in the {H,V} polarization basis the ONE detector probability distribution ratio, $P_{D4}/P_{D5}$, is 1, as it was in FIG. 2. FIG. 4 therefore illustrates that when the OTHER path means to control the probability distribution, namely polarizer 14 and detectors 15 and 16, is oriented along a complimentary polarization basis to that of the of the ONE path polarizers, the ONE detector probability distribution ratio, $P_{D4}/P_{D5}$, is 1.

As in the comparison of FIGS. 1-a,b and 2, comparison of FIGS. 3 and 4 demonstrates that the probability distribution ratios $P_{D4}/P_{D5}$ of detectors 18 and 19 are distinguishably different between FIGS. 3 and 4. The means to control the probability distribution of FIGS. 3 and 4 therefore constitutes a means to signal.

Figure 5:
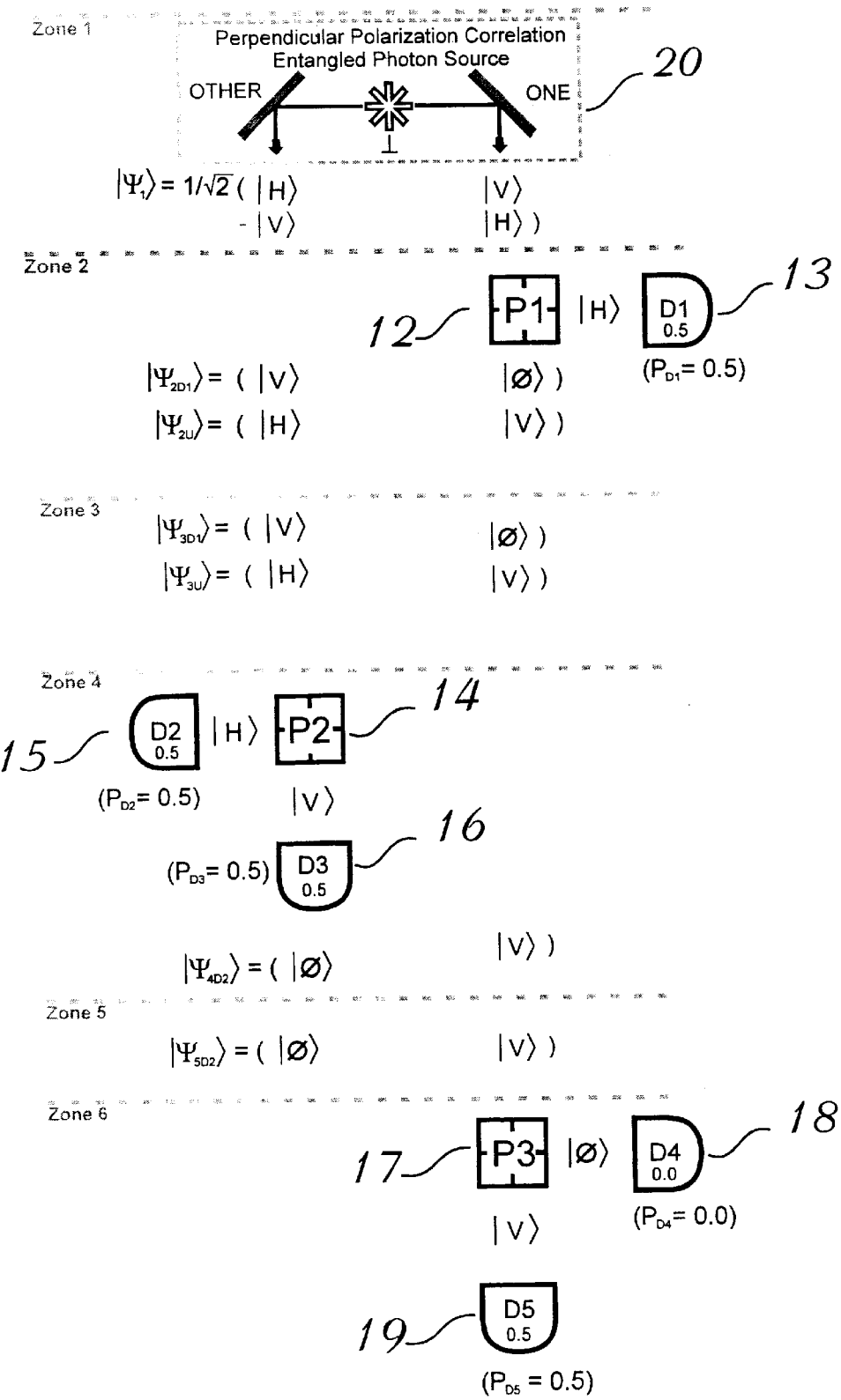
FIG. 5 is a schematic illustration of a further alternative embodiment of my invention employing a perpendicular polarization correlation entangled photon source.
Figure 6:
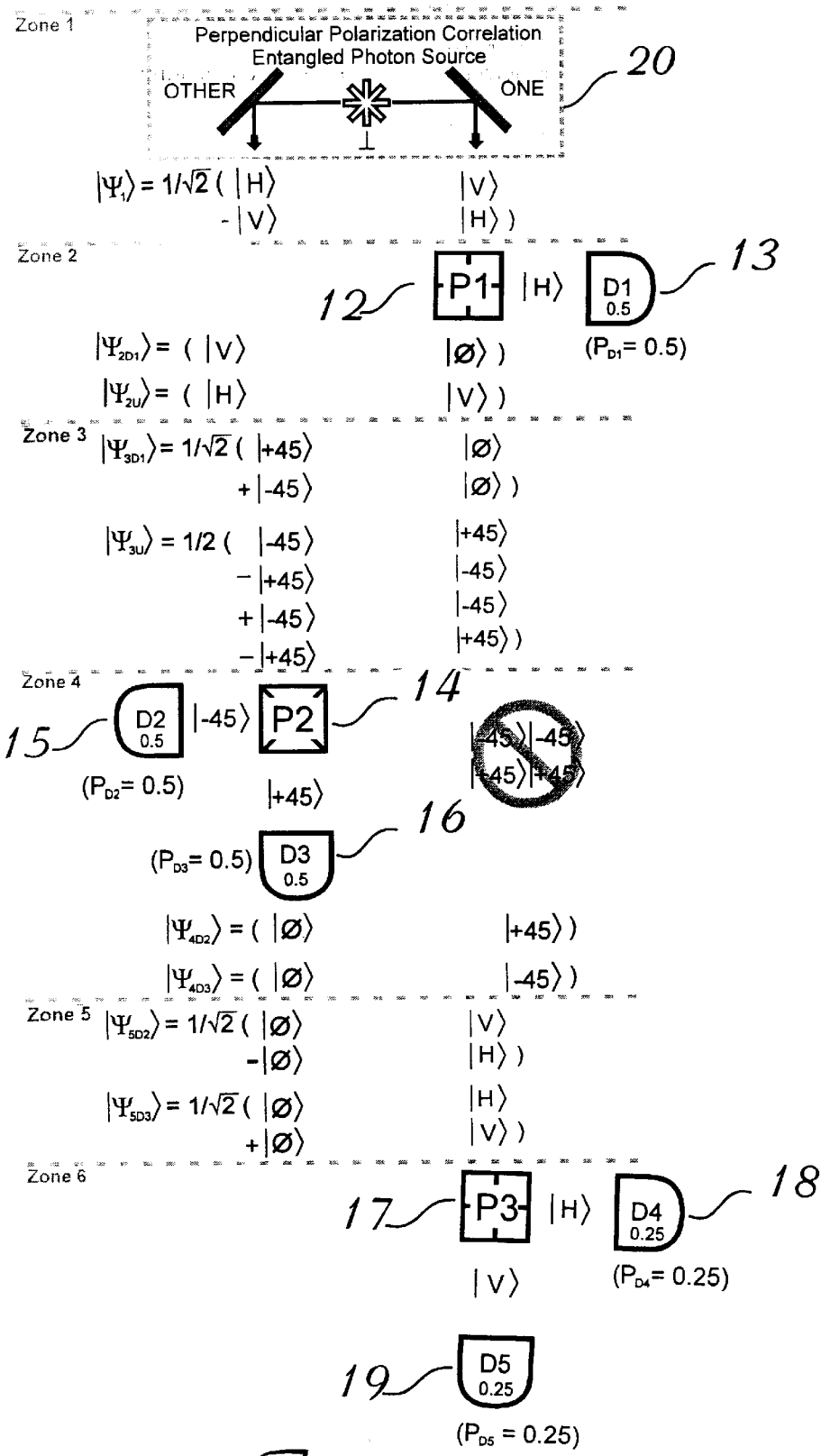
FIG. 6 is a schematic illustration of the invention of FIG. 5 modified to show how signaling can be switched.

FIGS. 5 and 6 are schematic illustrations of a further alternative embodiment of my invention employing a perpendicular polarization correlation entangled photon source, 20. With the exception of the entangled photon source, 20, the arrangement and orientation of all elements in FIG. 5 are the same as those of FIG. 1-a, and the arrangement and orientation of all elements of FIG. 6 are the same as those of FIG. 2. The source, 20, employed in the embodiment of FIGS. 5 and 6 is different from the source of FIGS. 1-a,b and 2. The source, 20, of FIGS. 5 and 6 emits photons which correlate to perpendicular polarizations according to the Conservation of Angular Momentum constraint imposed by the by the conditions of the creation of the entangled photons.

The ONE detector probability distribution ratios of FIGS. 5 and 6 match those of FIGS. 1-a,b and 2, respectively. The invention may therefore be employed with an entangled photon source of either type, parallel polarization correlation source 10, or perpendicular polarization correlation source 20.

Figure 7:
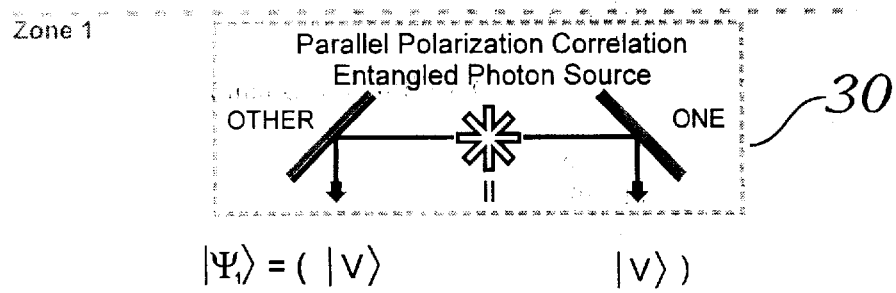
FIG. 7 is a schematic illustration of yet another alternative embodiment of my present invention employing a parallel polarization correlation entangled photon source emitting photons in a definite polarization state.

FIGS. 7 and 8 are schematic illustrations of yet another alternative embodiment of my present invention employing a parallel polarization correlation entangled photon source, 30, emitting photons in a definite polarization state, such as a Type I parametric down conversion source. Since source 30 emits photons which are already in a definite state, ONE path polarizer 12 and detector 13 can be eliminated from the apparatus. Zones 2–5 of FIG. 7 are therefore similar to Zones 3–6 of FIG. 1. The ONE detector probability $P_{D5}$ is double that of FIG. 1-a, ONE detector probability ratio, $P_{D4}/P_{D5}$, has the same value of zero. Zones 2–5 of FIG. 8 are similar to Zones 3–6 of FIG. 2, and the value of the ONE detector probability distribution, $P_{D4}/P_{D5}$, is also 1.

Many features of this invention may be altered without materially altering the ability to affect the observed probability distribution of ONE photons by manipulating the observed probability distribution of the OTHER photons by the inclusion or exclusion of polarizer 14. As shown in these Figures, the polarizers are of the thin-film beam-splitter variety. They could, however, be of other varieties, such as Wollaston prism polarizers (Karl Lambrecht part number MW2A-10-5), magnesium fluoride Rochon prisms (Karl Lambrecht part number MFRV-9), traditional 'pile of plates' polarizers, or dichroic plastic polarizing sheet polarizers (International Polarizer part number IP38). The signal modulating polarizer, OTHER polarizer 14, could be replaced by an electro-optic device which can be controlled to either deflect the OTHER photons through a polarizer oriented in a chosen basis or to pass them unaltered, or by other active polarization altering components, such as a Kerr cell or a Pockels cell. The effect of changing the polarization basis of OTHER polarizer 14 could similarly be accomplished by leaving polarizer 14 oriented in the {H,V} basis and introducing a suitably oriented half-wave plate or quarter-wave plate to alter the probability distribution of the OTHER photons at polarizer 14 and detectors 15 and 16.

It is important to note that in the methods of all of these Figures, and in any similar or derivative methods, the specific angles of the polarizers and the resulting latent polarization states of the photons are not, in themselves, significant. The significance is in the relationship of each polarizer to the known polarization states of the photons. Thus, if the apparatus were rotated 45 degrees, the {H,V} polarization basis of the photons emitted from source 10 would become a {+45,−45} polarization basis, the {H,V} basis polarizers would become {+45,−45} basis polarizers, and the {+45,−45} basis polarizers would become {H,V} polarizers.

With reference to FIGS. 1–8, I have particularly illustrated the preferred embodiment of my invention employing photons. Alternatively, my invention is suitable for a variety of correlated quantum objects including also bosons, fermions, and atoms. Any source of quantum objects is suitable for my invention provided the source produces correlated quantum objects. Furthermore, the controlling means described above, particularly described as optical polarizers, wave plates, and combinations thereof, may be replaced by any suitable spin selection device, and combinations thereof, which may be employed to select a desired quantum spin state probability distribution of the quantum objects to be observed. Suitable spin selection devices include, not only polarizing beam splitters, Nichols prisms, tourmaline crystals, calcite crystals, electro-optic crystals, non-linear optical crystals, birefringent polarizing elements, wave plates, Kerr cells, Pockels cells, Faraday rotators, optically rotating materials and solutions, polarizing plastic sheet material ('Polaroid' polarizers), polarization preserving optical fiber, similar optical polarization components and combinations thereof, and Stern-Gerlach spin analyzers. Suitable types of detectors for detecting or making an observation of the quantum state of one or both of the pair of quantum objects include photo-multiplier tubes, avalanche photodiodes, micro-channel plates, scintillation detectors and Faraday cups.

It is also important to note that signaling is not accomplished via the transmission of a single entangled photon pair, but via the transmission of an ensemble, or plurality, of entangled pairs. Only through the examination of the detector results for a plurality of entangled pairs is it possible to reliably measure the quantum state probability distribution, and therefore, to reliably signal. This is because the quantum state probability distribution of an ensemble of identically prepared entangled photon pairs reveals the quantum state probability distribution of its constituent photons. Since a single photon can only attain a single observed state, the whole probability distribution, which may include a superposition of states or a mixture of states, is not revealed by a single observation. Through a plurality of observations the quantum state probability distribution can be identified, with a greater certainty of the identification resulting from a larger number of observations.

The applications to which my invention may be applied are manifold, including but not limited to: faster-than-light (FTL) signaling and communication, secure signaling and communication, multiplexed FTL signaling and communication, FTL signal transmission between computing components, FTL spacecraft communications, FTL time synchronization, FTL quantum cryptography, FTL digital signal transmission, FTL analog signal transmission, FTL voice signal transmission, FTL music signal transmission, FTL video signal transmission, FTL internet communications, FTL wide area network communications, FTL local area network communications, FTL inter-computer communications, FTL intra-computer communications, intra-CPU communications, FTL multi-processor interconnections, FTL CPU to memory interconnections, FTL general telecommunications, FTL remote control of machinery, and FTL telepresence.

The utility of my invention may be more completely understood through the following brief explanations of its method of use to accomplish the first six of the above listed applications.

My invention enables FTL signaling between two points, which I will call the sender and the receiver, located at any desired distance apart, in the following manner. The entangled photon source, 10, 20, or 30, is placed at a point substantially equidistant from the sender and the receiver. It is not necessary for the sender, source, and receiver to lie along a single line. Entangled pair photons are emitted from the source into two streams, OTHER and ONE, such that the OTHER photons are directed to the sender and the ONE photons are directed to the receiver. The OTHER path and ONE path entangled photon wave function components of each entangled pair will arrive at the sender and the receiver, respectively, substantially simultaneously. The sender's apparatus and the receiver's apparatus are arranged such that an entangled pair ONE path entangled photon wave function component will first pass through the receiver's first polarizer, polarizer 12, prior to the OTHER path entangled photon wave function component passing through the sender's polarizer, 15. Correspondingly, the OTHER path entangled photon wave function component passes through sender's polarizer, 14, and is detected by either of sender's detectors, 15 and 16, prior to the ONE path entangled photon wave function component passing through the receiver's second polarizer, 17. Providing that the difference in the distances from the source to the sender's polarizer and the distance from the source to the receiver's polarizer is less than the distance from the sender's polarizer to the receiver's polarizer, any change in the polarization basis of sender's polarizer 15 will result in a corresponding receiver detector response at a signaling speed which is faster than light. This means that a light signal, directed at the receiver and emitted by the sender at the moment of signaling via the EPR effect, as employed in my invention, would arrive at the receiver after the EPR effect signal was observed by the receiver. There will be an initial delay in establishing the communication link between the sender and the receiver because of the speed of light transit time for the entangled pairs to begin arriving at the sender and receiver, but once this stream of entangled pairs is established the signaling is accomplished by means of the EPR effect, which is not limited by the speed of light. The effective speed of transmission is only limited by the need for the entangled photon wave function components to interact with the ONE and OTHER optical elements distinguishably in the order presented above, such that the temporal separation of the sequential interactions is not substantially less than the temporal coherence length of the entangled pair photon wavepacket. For example, if the distance between the sender and the receiver is 100 km, the temporal coherence length of the entangled pair photon wavepacket is 500 $\mu$m, and the temporal separation of the entangled pair wave function interactions with the sender's polarizer and the receiver's polarizer is 10 ns (corresponding to about 3 m difference in distance from the source-to-sender and source-to-receiver), the effective speed of communication would be $$(10^5 \text{ m})/(10^{-8} \text{ s}) = 10^{13} \text{ m/s},$$

or more than 33,000 times the speed of light ($2.99 \times 10^8$ m/s).

My invention enables secure signaling and communication between two points, the sender and the receiver, located at any desired distance apart, by means of delaying the sender's control of the probability distribution of the entangled photons until just prior to the receiver's observation of the photons. Until the OTHER path entangled photon wave function component is intercepted by sender's polarizer 14, there is no information content in either the ONE or the OTHER photon stream. The information is impressed on the ONE path entangled photons only after the sender's interception of those photon's OTHER path entangled pair partners. If the distance of flight of the ONE photons from the moment of sender signaling to the moment of receiver detection is wholly under the control of the receiver, then any attempt by an eavesdropper to tap into the ONE photon path closer to the source will not reveal any information since no information is present in that photon stream prior to detection by the sender's apparatus. No information is ever present in the OTHER path photon stream, so it would be equally fruitless for an eavesdropper to tap into that stream at any point. An eavesdropper could only succeed by tapping into the receiver's photon stream closer to the source, then allowing the photons to propagate the same distance as they would to the original intended receiver, and to place an identical receiver apparatus as the original intended receiver's apparatus at that distance. If the distance to the original intended receiver's apparatus is unknown, or if the details of the original intended receiver's apparatus are unknown, then the eavesdropper would have to determine these details by trial and error prior to accomplishing successful eavesdropping, further complicating his nefarious task. The signals transmitted by means of my invention can, of course, be encrypted by any suitable means prior to transmission. The absence of information in the photon streams until just before detection, as described above, adds an additional, novel, level of information security.

My invention enables multiplexed FTL signaling and communication by employing both degenerate and non-degenerate entangled photons. Degenerate entangled photons both have substantially the same energy, frequency, and wavelength. Each photon of a degenerate entangled pair carries half of the energy of the pump photon which created them. Non-degenerate entangled photons distribute the energy of the original pump photon nonuniformly, such that one photon, commonly called the signal photon, carries a greater energy and the other photon, commonly called the idler photon, carries the remaining, smaller energy. The individual photons of a non-degenerate entangled photons pair therefore have different wavelengths. In the same manner as wavelength division multiplexing is employed in conventional optical communications, many different signals can be sent through a single communications channel by means of my invention by separating the different wavelengths and controlling each separated wavelength band to send FTL signals by means of my invention.

My invention enables FTL signal transmission between the constituent elements of a computing device, computing system, or computing network by replacing the conventional electrical or optical interconnections with instantaneous quantum correlation connections. FTL interconnections allow the constituent elements of these devices, systems, or networks to be located at large physical distances from each other without suffering the attendant communication delay time of conventional interconnection technologies. Thus, for example, a computer CPU located in one city could access a RAM memory device located in another city hundreds of miles away at a duplex communication rate identical to, or better than, the duplex communication rate achieved by conventional means between that CPU and a similar RAM memory device located in immediate proximity to the CPU. In a similar manner the connections between CPUs and the connections of computing networks, such as the Internet, can be greatly facilitated.

Another example of the value of such FTL interconnections would occur in communications and control of space probes. Space probes currently must carry substantial computing capability on-board in order to perform their tasks at the correct time. Much of this computing could be performed by ground-based computers and the resulting control commands, and sensor feedback from the space probe, could be communicated substantially instantaneously, over an distance. A suitable, and convenient, source of polarization entangled photons for use in space applications is atomic cascade two-photon emission from the corona or prominences of the sun or other star.

My invention provides a means and apparatus to establish a co-temporal reference point for two space-like separated measurement apparatus via FTL signaling. This is accomplished by sending a time synchronization signal from the location of one of the timekeeping apparatus to the location of the second timekeeping apparatus substantially instantaneously.

Having now fully described my invention, it will be apparent to one of ordinary skill in the art that many changes and modifications can be made thereto without departing from the spirit or scope of my invention as set forth herein.

What is claimed:

1. A method for controlling the quantum state probability distribution of one quantum object of a spin entangled pair of quantum objects, comprising the steps of:
   a. providing an entangled pair of quantum objects, said objects existing in a superposition of states in at least one chosen spin measurement basis;
   b. providing means for controlling the quantum state probability distribution of the one quantum object which is capable of choosing the spin state probability distribution of the other quantum object, of the pair of entangled quantum objects in a chosen spin basis;
   c. choosing whether to change the spin state probability distribution the other quantum object using said controlling means;
   d. choosing whether to observe the quantum spin state of the other quantum object in a chosen basis using said controlling means;
   e. subsequently observing the quantum spin state of the one quantum object of said entangled pair of quantum objects in the said definite spin state spin basis to determine if said quantum state probability distribution of said one quantum object has been altered by an observation of the quantum spin state of said other quantum object.

2. A method as in claim 1, wherein said entangled quantum objects are selected from the group consisting of bosons, fermions and atoms.

3. A method as in claim 1, wherein the one quantum object and the other quantum object of the pair of entangled quantum objects are provided as part of a pair of streams of entangled quantum objects.

4. A method as in claim 1, wherein the pair of entangled quantum objects is provided y a source of entangled pairs of quantum objects.

5. A method as in claim 4, wherein the pair of entangled quantum objects is provided by two-quantum object absorption/two-quantum object emission processes.

6. A method as in claim 4, wherein the pair of entangled quantum objects is provided from a source of entangled photons selected from the group consisting of spin conserving two photon emission and optical parametric down-conversion processes.

7. A method as in claim 6, wherein said optical parametric down-conversion processes include both Type I and Type II spin correlation processes.

8. A method as in claim 1, further including the step of providing at least one of the pair of entangled quantum objects with a definite spin state in a chosen spin basis prior to using said means for controlling.

9. A method as in claim 1, further including the step of observing the quantum state probability distribution of a plurality of the one quantum objects to determine if said quantum state probability distribution of said one quantum objects has been altered by observations of the quantum spin states of a plurality of said other quantum objects.

10. A method as in claim 1, wherein said means for controlling includes a spin selection device selected from the group consisting of optical polarization components.

11. A method as in claim 10, wherein said optical polarization components are selected from the group consisting of polarizing beam splitters, Nichols prisms, tourmaline crystals, calcite crystals, electro-optic crystals, non-linear optical crystals, birefringent polarizing elements, wave plates, Kerr cells, Pockels cells, Faraday rotators, optically rotating materials and solutions, polarizing plastic sheet material ('Polaroid' polarizers), polarization preserving optical fiber, similar optical polarization components and combinations thereof.

12. A method as in claim 1, wherein said means for controlling includes non-optical spin-selection devices.

13. A method as in claim 12, wherein said non-optical spin-selection devices are Stem-Gerlach spin analyzers.

14. A method as in claim 1, wherein the one quantum object and the other quantum object of the pair of entangled quantum objects are provided equal probability in two streams of quantum objects by one or more devices selected from the group consisting of lenses, mirrors, beam splitters, polarizing beam splitters, and combinations thereof.

15. A method as in claim 1, wherein said step of choosing whether to observe the probability distribution of the quantum state of the other quantum object includes not observing the quantum state of the other quantum object.

16. A method as in claim 1, wherein the step of choosing whether to observe the quantum spin state of the other quantum object includes observing the quantum spin state of the other quantum object.

17. A method as in claim 16, wherein said observing of the quantum spin state of the other quantum object includes altering the probability distribution of the one quantum object before observing the quantum spin state of the one quantum object.

18. A method as in claim 1, wherein said step of observing the quantum spin state of the one quantum object includes observing the quantum spin state of the one quantum object to determine if it is in a quantum spin state complimentary to said observed quantum spin state of the other quantum object.

19. A method as in claim 1, wherein said pair of entangled quantum objects is provided in orthogonal polarization states, upon observation.

20. A method as in claim 1, wherein said pair of entangled quantum objects is provided in parallel polarization states, upon observation.

21. A system for controlling the quantum state probability distribution of one quantum object of a spin entangled pair of quantum objects, comprising:
   a. means for providing an entangled pair of quantum objects, said objects existing in a superposition of states in at least one chosen spin measurement basis;
   b. means for controlling the quantum state probability distribution of the one quantum object which is capable of choosing the spin state probability distribution of the other quantum objects, of the pair of entangled quantum objects in a chosen spin basis;
   c. means for subsequently observing the quantum spin state of the one quantum object of said entangled pair of quantum objects in the said definite spin state spin basis to determine if said quantum state probability distribution of said one quantum object has been altered by an observation of the quantum spin state of said other quantum object.

22. A system as in claim 21, wherein said entangled quantum objects are selected from the group consisting of bosons, fermions and atoms.

23. A system as in claim 21, wherein the one quantum object and the other quantum object of the pair of entangled quantum objects are provided as part of a pair of streams of entangled quantum objects.

24. A system as in claim 21, wherein the means for providing a pair of entangled quantum objects includes a source of entangled pairs of quantum objects.

25. A system as in claim 24, wherein the pair of entangled quantum objects is provided by a two-quantum object absorption/two-quantum object emission process.

26. A system as in claim 24, wherein the pair of entangled quantum objects is provided from a source of entangled photons selected from the group consisting of spin conserving two photon emission and optical parametric down-conversion processes.

27. A system as in claim 26, wherein said optical parametric down-conversion emission includes both Type I and Type II spin correlation emission.

28. A system as in claim 21, further including means for providing at least one of the pair of entangled quantum objects with a definite spin state in a chosen spin basis prior to using said means for controlling.

29. A system as in claim 21, wherein the means for subsequently observing includes means for observing the quantum state probability distribution of a plurality of the one quantum objects to determine if said quantum state probability distribution of said one quantum objects has been altered by observations of the quantum spin states of a plurality of said other quantum objects.

30. A system as in claim 21, wherein said means for controlling includes a spin selection device selected from the group consisting of optical polarization components.

31. A system as in claim 30, wherein said optical polarization components are selected from the group consisting of polarizing beam splitters, Nichols prisms, tourmaline crystals, calcite crystals, electro-optic crystals, non-linear optical crystals, birefringent polarizing elements, wave plates, Kerr cells, Pockels cells, Faraday rotators, optically rotating materials and solutions, polarizing plastic sheet material ('Polaroid'=0 polarizers), polarization preserving optical fiber, similar optical polarization components and combinations thereof.

32. A system as in claim 21, wherein said means for controlling includes non-optical spin-selection devices.

33. A system as in claim 32, wherein said non-optical spin-selection devices are Stem-Gerlach spin analyzers.

34. A system as in claim 21, wherein the one quantum object and the other quantum object of the pair of entangled quantum objects are provided equal probability in two streams of quantum objects by one or more devices selected from the group consisting of lenses, mirrors, beam splitters, polarizing beam splitters, and combinations thereof.

35. A system as in claim 21, wherein said means for controlling is selected to not observe the quantum state of the other quantum object.

36. A system as in claim 21, wherein the means for controlling is selected to observe the quantum state of the other quantum object.

37. A system as in claim 36, wherein said observing of the quantum spin state of the other quantum object includes altering the probability distribution of the one quantum object before observing the quantum spin state of the one quantum object.

38. A system as in claim 21, wherein said means of observing the quantum spin state of the one quantum object includes observing the quantum spin state of the one quantum object to determine if it is in a quantum spin state complimentary to said observed quantum spin state of the other quantum object.

39. A system as in claim 21, wherein said pair of entangled quantum objects is provided in orthogonal polarization states, upon observation.

40. A system as in claim 21, wherein said pair of entangled quantum objects is provided in parallel polarization states, upon observation.

* * * * *